United States Patent [19]
Krall et al.

[11] Patent Number: 5,232,107
[45] Date of Patent: Aug. 3, 1993

[54] MULTI-LAYER PLASTIC BOTTLE WITH A HANDLE

[75] Inventors: Thomas J. Krall, Toledo; Robert A. Myers, Perrysburg, both of Ohio

[73] Assignee: Owens-Illinois Plastic Products Inc., Toledo, Ohio

[21] Appl. No.: 990,152

[22] Filed: Dec. 14, 1992

Related U.S. Application Data

[62] Division of Ser. No. 804,826, Dec. 6, 1991, Pat. No. 5,188,849.

[51] Int. Cl.$^5$ .............................................. B65D 23/00
[52] U.S. Cl. ...................................... 215/1 C; 220/771
[58] Field of Search ................ 215/1 C; 220/771, 675

[56] References Cited

U.S. PATENT DOCUMENTS

| | | | |
|---|---|---|---|
| 2,991,500 | 7/1961 | Hagen | 425/527 X |
| 3,176,879 | 4/1965 | Mojonnier | 220/771 X |
| 3,366,290 | 1/1968 | Mojonnier et al. | 222/572 |
| 3,444,285 | 5/1969 | Mason | 264/536 |
| 3,851,029 | 11/1974 | Cornett, III et al. | 215/1 C X |
| 3,892,828 | 7/1975 | Weatherly et al. | 264/536 X |
| 4,079,850 | 3/1978 | Suzuki et al. | 215/1 C |
| 4,116,608 | 9/1978 | Uhlig | 425/525 |
| 4,195,053 | 3/1980 | Lambarth | 425/525 X |
| 4,207,990 | 6/1980 | Weiler et al. | 215/1 C X |
| 4,463,867 | 8/1984 | Nagel | 215/1 C X |
| 4,994,313 | 2/1991 | Shimizu et al. | 215/1 C X |
| 5,022,544 | 6/1991 | Dundas et al. | 215/1 C X |
| 5,037,684 | 8/1991 | Dundas et al. | 215/1 C X |
| 5,087,406 | 2/1992 | Krall et al. | 215/1 C X |
| 5,188,849 | 2/1993 | Krall et al. | 425/525 |

FOREIGN PATENT DOCUMENTS 15-402265 2/1940 Japan .
58-171328 10/1983 Japan .

*Primary Examiner*—Steven M. Pollard

[57] ABSTRACT

The multi-layer plastic bottle with a handle for holding liquids and the like which includes molds enclosing a hollow parison of molten plastic which is at a blow molding temperature, pinching a portion of the hollow parison as the mold closes to form a hollow moil portion and neck portion, simultaneously pinching a portion of the hollow parison to form a hollow handle portion while leaving a portion of the parison to provide a passage from the moil portion to the handle portion and thereafter expanding the parison through the moil portion to form the container.

2 Claims, 5 Drawing Sheets

MULTI-LAYER PLASTIC BOTTLE WITH A HANDLE

This is a divisional of copending application Ser. No. 07/804,826 filed on Dec. 6, 1991 now U.S. Pat. No. 5,188,849.

This invention relates to blow molding hollow plastic articles and particularly to blow molding hollow plastic articles with integral handles.

BACKGROUND AND SUMMARY OF THE INVENTION

In the blow molding of hollow plastic articles, it has been common to close a hot tube within a mold and blow a hollow container with an integral handle. Where the tube comprises a single layer of plastic, this is readily achieved by pinching off the plastic in the area that forms the hollow of the handle. However, where a multi-layer plastic is desired, as, for example, where there is an intermediate plastic layer required for providing properties such as permeability or other properties as, for example, are required for containing solvent based products, it has been found that in order to weld the pinch off areas, a large and unsightly pinch off must be provided which not only is unsightly but forms a seam line that makes the handle uncomfortable to hold. In addition, this construction weakens the drop test performance of the container.

Accordingly, among the objectives of the present invention are to provide a method and apparatus for forming multi-layer containers having an integral handle which provide for proper pinch off; which avoid large uncomfortable and unsightly pinch offs; which have adequate drop test performance; and which minimize the number of handling steps in the formation of the bottle.

In accordance with the invention the method and apparatus for making a multi-layer plastic bottle with a handle for holding liquids and the like comprises enclosing a hollow parison of molten plastic which is at a blow molding temperature, pinching a portion of the hollow parison as the mold closes to form a hollow moil portion, simultaneously pinching a portion of the hollow parison to form a hollow handle portion while leaving a portion of the parison to provide a passage from the moil portion to the handle portion and thereafter expanding the parison through the moil portion to form the container.

DETAILED DESCRIPTION OF THE PREFERRED EMBODIMENT

Figure 1:
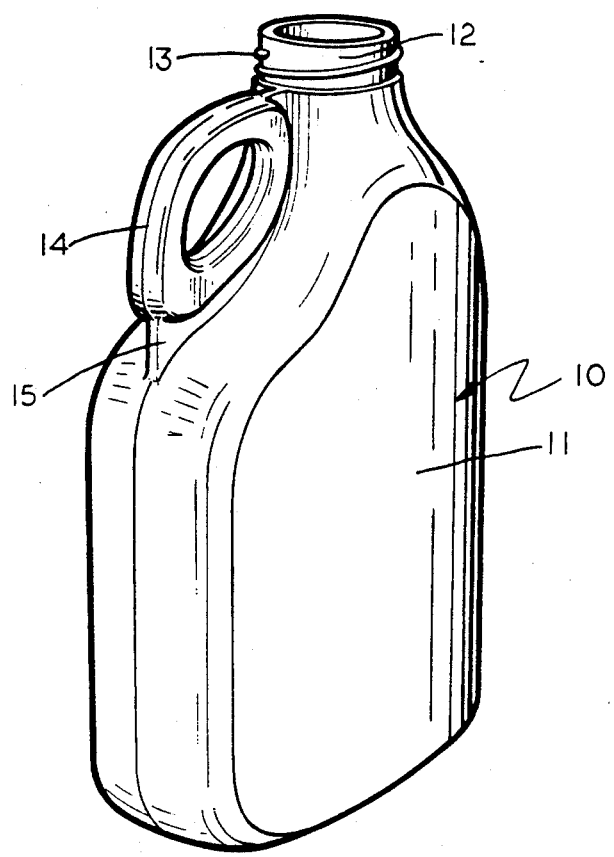
FIG. 1 is a perspective view of a container embodying the invention.

Referring to FIG. 1, the container 10 made in accordance with the invention comprises a hollow body 11 having a neck or finish 12 with fastening means for engaging a cap such as threads 13 thereon an integral hollow handle 14 and a wall 15 connecting the handle 14 to the body 11.

Figure 2:
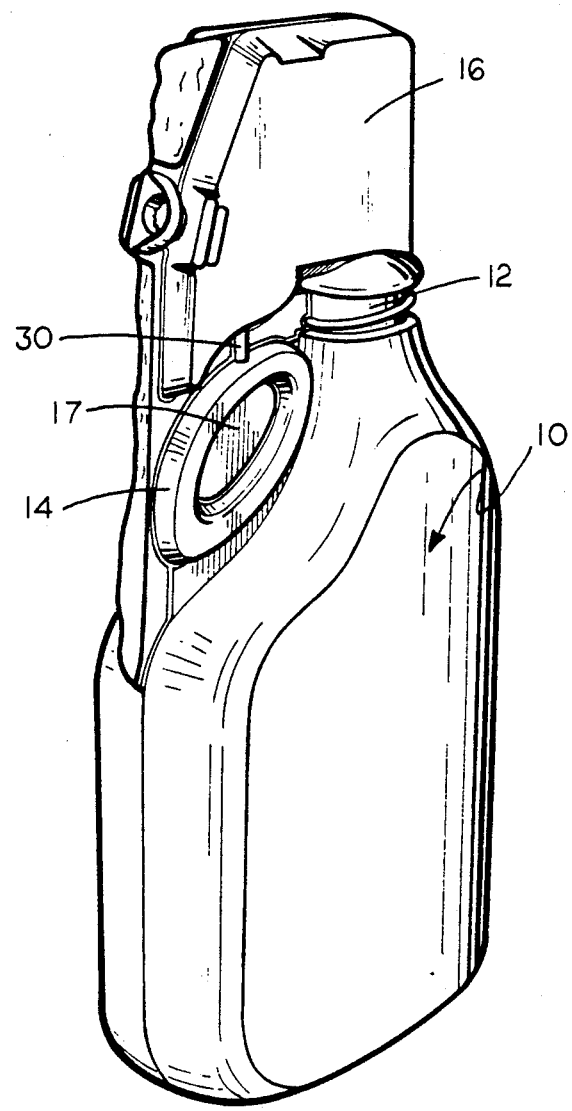
FIG. 2 is a perspective view of the container after it is blown and prior to being trimmed.
Figure 4:
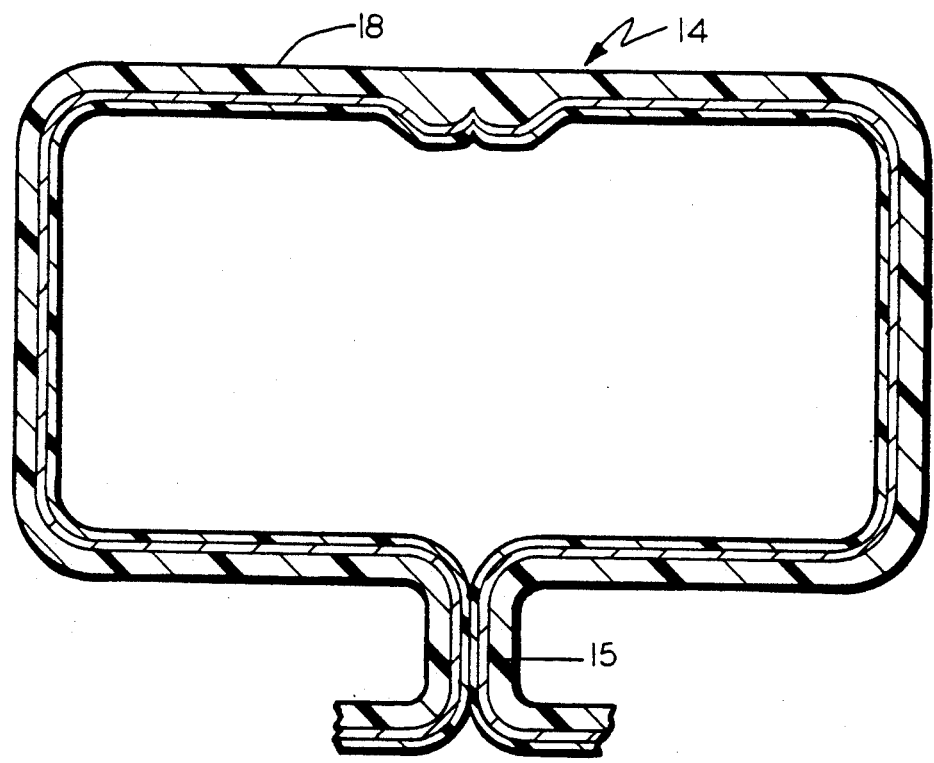
FIG. 4 is a fragmentary sectional view taken along the line 4—4 in FIG. 3.
Figure 3:
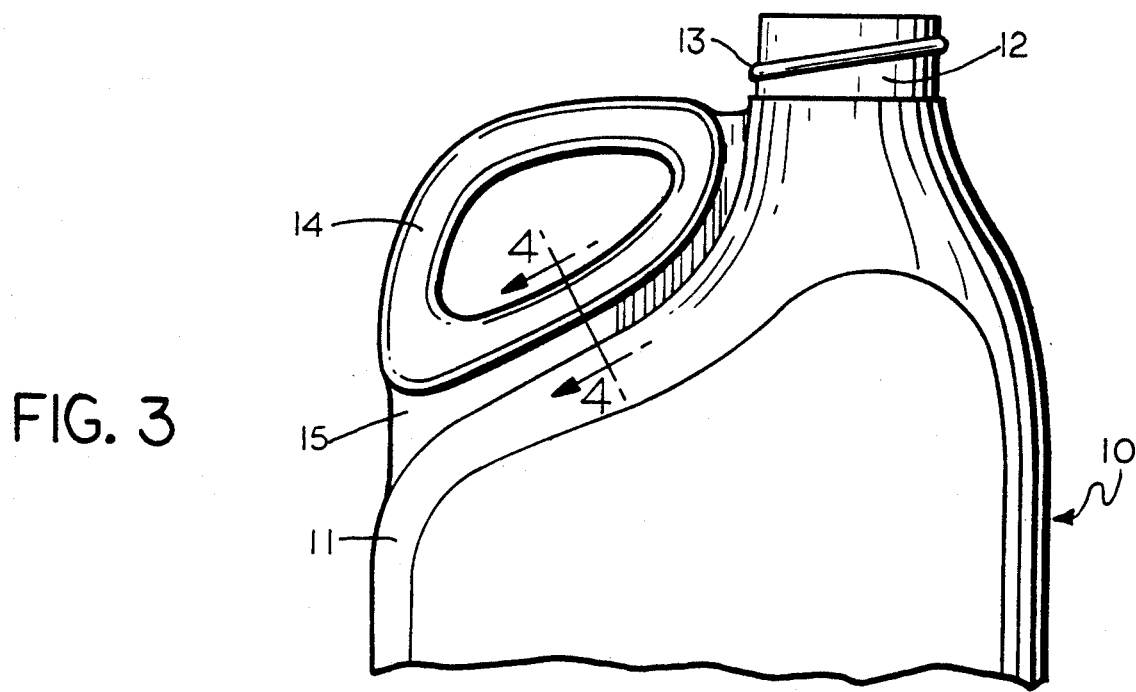
FIG. 3 is a fragmentary elevational view of the container.
Figure 7:
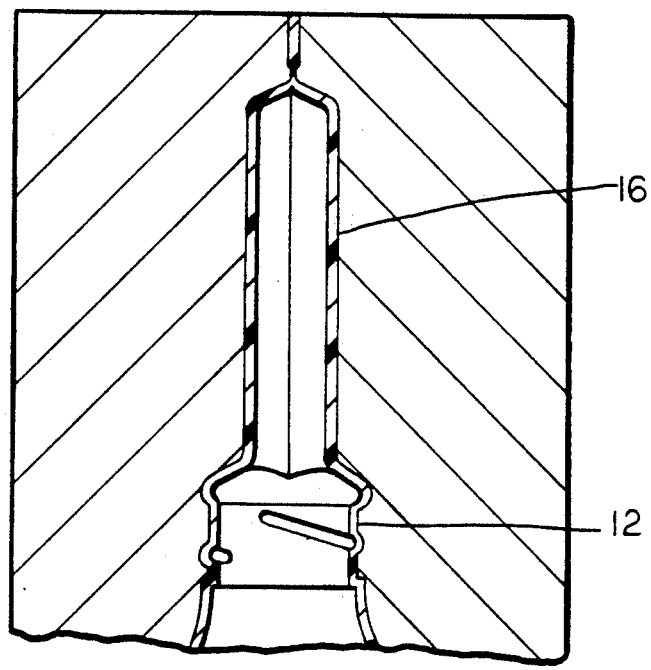
FIG. 7 the fragmentary sectional view taken along the line 7—7 in FIG. 6 with the other mold section in position.
Figure 8:
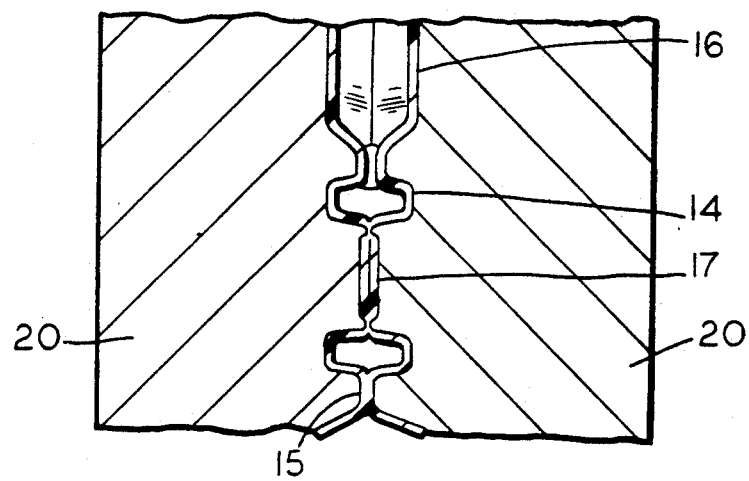
FIG. 8 is a fragmentary sectional view taken along the line 8—8 in FIG. 6 with the other mold section in position.

Referring to FIG. 2, as the container 10 is formed, as presently described, it includes a hollow moil portion 16 which is connected to both the handle portion 14 and the finish 12 (FIG. 7). In addition, flat plastic portion 17 closes the finger receiving opening of the handle (FIG. 8). The container thus must be trimmed to provide the configuration such as shown in FIG. 3 by removing the moil portion 16 and plastic portion 17. As can be seen from FIG. 4 which is an greatly enlarged section through the handle, the handle 14 is a multi-layer handle having a smooth continuous surface 18 and the layers of plastic are joined to form the doubled layered wall 15 that connects the handle to the body 11 of the container 10. The container is formed by expanding a parison within the sections of a mold.

Figure 5:
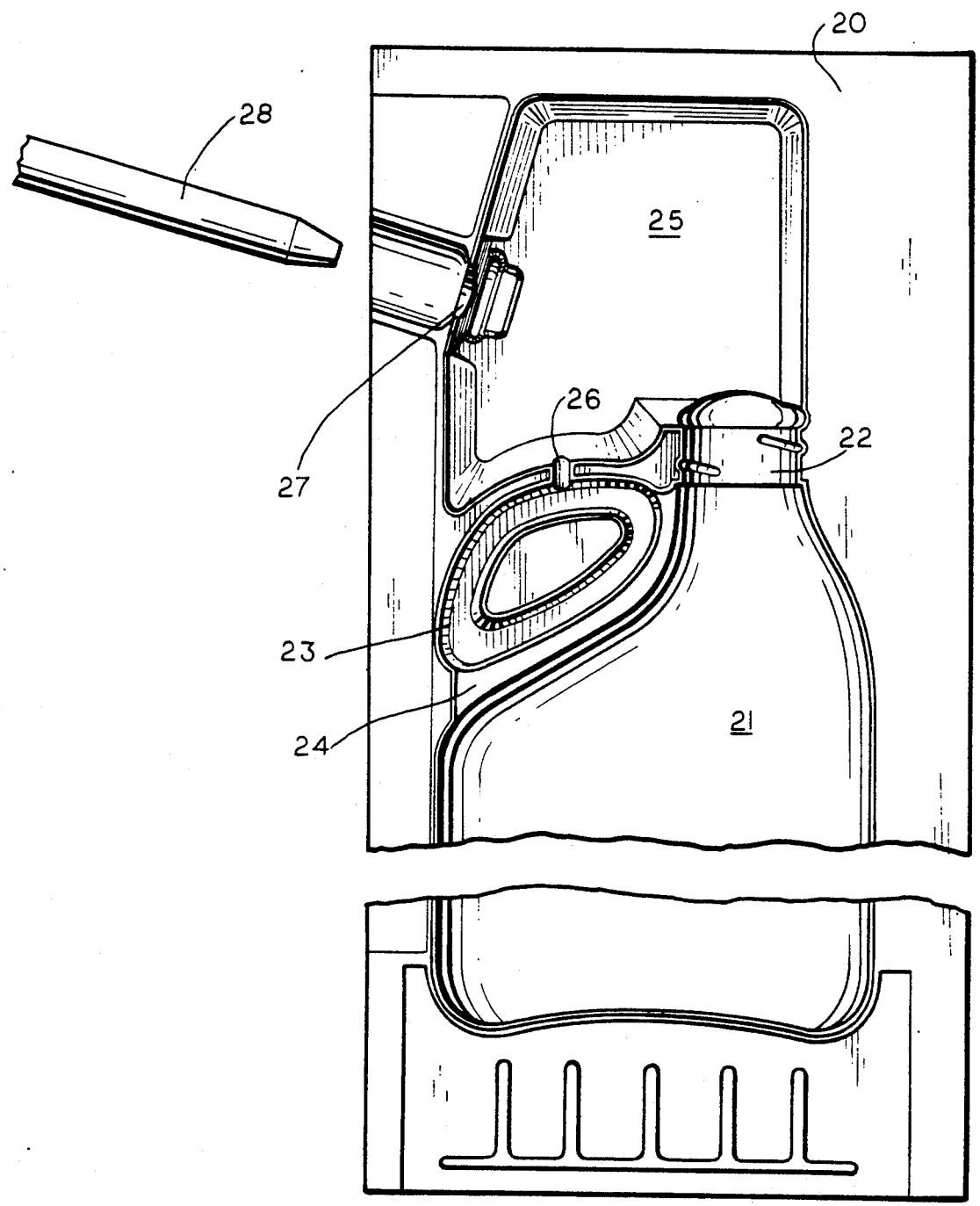
FIG. 5 is a fragmentary plan view of a mold for forming the container.
Figure 6:
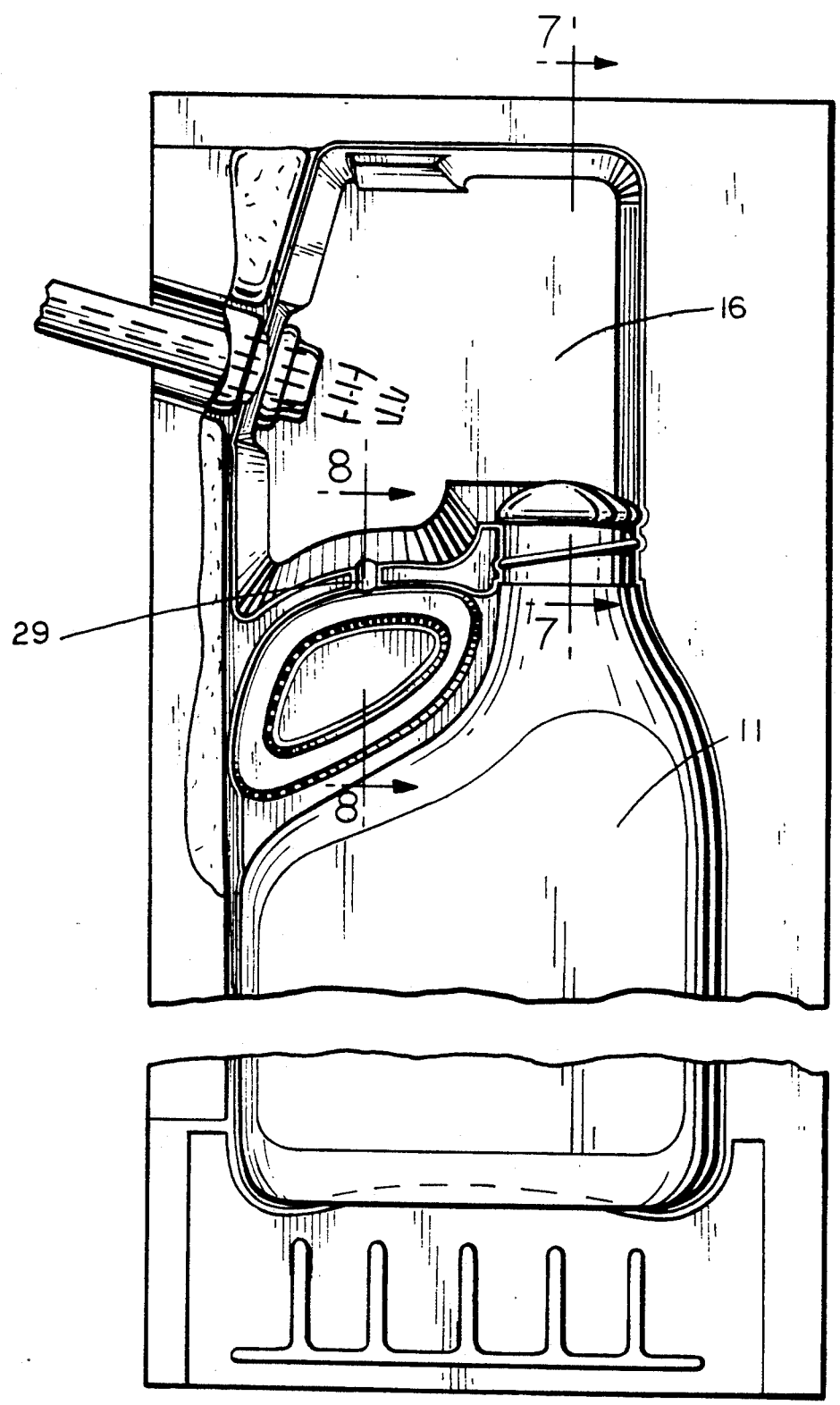
FIG. 6 is a fragmentary plan view showing the container in a mold section after it has been blown.

Referring to FIG. 5, one mold section 20 is shown and comprises a hollow portion 21 which is adapted to define the body of the container, a generally semi-circular portion 22 adapted to define the finish 12, a continuous groove 23 for defining part of the handle, a shallow groove 24 for defining the wall 15 and an upper cavity 25 for defining part of the moil portion 16. The mold section 20 further includes a small groove 26 for providing communication between the moil cavity 25 and the groove 23. Finally, the section 20 includes a guide portion 27 for receiving a blow pipe 28. The parison may comprise a extruded tube of plastic a blow molding temperature. When the sections of the mold are closed about the parison, the lower portion of the parison is pinched by a severe pinch off for defining the body 11 of the container, the upper portion is pinched for defining the moil portion 16, an intermediate portion is pinched for defining the handle 14, the wall 24 and the portion 17 while the grooves 26 defines a passage 30 between the moil portion 25 and the handle portion 23. Thus when the blow pipe 28 is inserted to blow the container, as shown in FIG . 6, the expanding fluid can flow from the interior of the hollow moil 16 to the interior of the body 11 and also through the hollow portion 29 defined by the passage 30 to the interior of the handle so that the handle is blown outwardly.

After the blow molding, the container is removed from the mold and trimmed by severing the moil portion 16, wall portion 17 and trimming the finish 12.

The resultant container has a handle which does not have a rough seam line in the area of the upper portion of the handle (FIG. 4) which is engaged by the fingers. The severe pinch off in the wall 15 required for maintaining properties, such as permeability, is at the area not engaged by the fingers. Therefore, the container is more comfortable to hold and is not unsightly, has adequate drop test performance and has been made with a minimum of handling steps.

What is claimed is:

1. A hollow blown plastic article comprising:

a hollow body portion, an integral neck portion, an integral hollow handle portion connected to the body portion by an integral wall, an integral hollow moil portion connected to the handle portion and the neck portion by said integral wall, and an integral passage in said integral wall communicating between the moil portion and the hollow handle portion, said passage between the moil portion and the handle portion providing the only passage to the handle portion.

2. The blown article set forth in claim 1 wherein said blown article comprises a multi-layer walls, the internal portion of the handle being smooth and seamless, the intermittent wall connecting the handle to the body portion comprises a double layer of plastic, each layer being multi-layer.

* * * * *